US012486873B2

(12) United States Patent
Partyka et al.

(10) Patent No.: US 12,486,873 B2
(45) Date of Patent: Dec. 2, 2025

(54) TOOTHED CONNECTION FOR MATING STEERING SYSTEM COMPONENTS

(71) Applicant: Steering Solutions IP Holding Corporation, Saginaw, MI (US)

(72) Inventors: Michael E. Partyka, Saginaw, MI (US); William J. Knight, Bay City, MI (US); Marcus Braem, Birch Run, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 18/671,419

(22) Filed: May 22, 2024

(65) Prior Publication Data
US 2024/0392839 A1 Nov. 28, 2024

Related U.S. Application Data

(60) Provisional application No. 63/468,297, filed on May 23, 2023.

(51) Int. Cl.
*B62D 3/02* (2006.01)
*F16D 1/027* (2006.01)
*F16D 1/108* (2006.01)
*F16D 1/10* (2006.01)

(52) U.S. Cl.
CPC ............ *F16D 1/108* (2013.01); *F16D 1/027* (2013.01); *B62D 3/02* (2013.01); *F16D 2001/103* (2013.01)

(58) Field of Classification Search
CPC ..... F16D 2001/103; F16D 1/027; B62D 1/16; F16C 2326/24
See application file for complete search history.

(56) References Cited

U.S. PATENT DOCUMENTS 4,269,043 A * 5/1981 Kizu .................. F16D 3/76
464/83
4,921,367 A * 5/1990 Everett, II ............. B62D 1/16
403/379.3
(Continued)

FOREIGN PATENT DOCUMENTS

DE 102010064085 A1 6/2012
DE 202013103613 U1 10/2013
(Continued)

OTHER PUBLICATIONS

English translation of Office Action regarding corresponding DE App. No. 10 2024 114 349.5; issued Feb. 20, 2025.

*Primary Examiner* — Paul N Dickson
*Assistant Examiner* — Matthew D Lee
(74) *Attorney, Agent, or Firm* — Dickinson Wright PLLC

(57) ABSTRACT

A connection assembly includes a male component having a male connection end portion. The connection assembly also includes a female component having a female connection end portion for receiving the male connection end within a bore defined therein, wherein the male component and the female component each have a non-circular cross-section within a connection assembly thereof. The connection assembly further includes a first plurality of teeth formed on an outer surface of the male component. The connection assembly yet further includes a second plurality of teeth formed on an inner surface of the female component.

20 Claims, 4 Drawing Sheets

(56) References Cited

U.S. PATENT DOCUMENTS

| | | | | |
|---|---|---|---|---|
| 5,732,600 A * | 3/1998 | Peterson | ................... | F16D 1/02 |
| | | | | 296/190.07 |
| 5,749,786 A * | 5/1998 | Pattok | ...................... | B62D 1/16 |
| | | | | 464/106 |
| 2004/0118238 A1* | 6/2004 | Toth | ........................ | B21K 1/12 |
| | | | | 74/492 |
| 2014/0241795 A1* | 8/2014 | Hebenstreit | ............. | B62D 1/16 |
| | | | | 403/359.1 |
| 2015/0040715 A1* | 2/2015 | Assmann | ................. | B62D 1/20 |
| | | | | 74/498 |
| 2016/0016603 A1* | 1/2016 | Tinnin | .................. | F16B 37/041 |
| | | | | 403/376 |
| 2018/0223910 A1* | 8/2018 | Aiba | ..................... | F16D 1/0858 |
| 2021/0179163 A1* | 6/2021 | Tomimatsu | .............. | B62D 1/20 |

FOREIGN PATENT DOCUMENTS

| | | | | |
|---|---|---|---|---|
| DE | 102015201542 A1 * | 8/2016 | ............. | B62D 1/20 |
| DE | 102015219644 A1 | 4/2017 | | |
| EP | 1101686 A1 * | 5/2001 | ............ | B62D 1/185 |
| FR | 2313593 A1 * | 12/1976 | | |
| GB | 2267873 A * | 12/1993 | ............ | B62D 1/192 |
| JP | 61160629 A * | 7/1986 | | |
| JP | 09240494 A * | 9/1997 | ............... | B62D 1/16 |
| JP | 2012102868 A * | 5/2012 | ............... | B62D 1/16 |
| KR | 0167434 B1 * | 1/1999 | | |
| WO | WO-9425766 A1 * | 11/1994 | ............ | B62D 1/185 |

* cited by examiner

TOOTHED CONNECTION FOR MATING STEERING SYSTEM COMPONENTS

CROSS-REFERENCE TO RELATED APPLICATION

This application claims the benefits of priority to U.S. Provisional Patent Application Ser. No. 63/468,297, filed May 23, 2023, the disclosure of which is incorporated by reference herein in its entirety.

FIELD OF THE INVENTION

This disclosure relates to a steering systems and, more particularly, to a toothed connection for mating steering system components.

BACKGROUND

A vehicle, such as a car, truck, sport utility vehicle, crossover, mini-van, marine craft, aircraft, all-terrain vehicle, recreational vehicle, or other suitable vehicles, include various steering system schemes. Mechanical connections between structural components of steering systems are made in several locations. One of the many connections used for an assembly operation for a vehicle involves the assembly of a "double-D" connection on the vehicle body and chassis in different locations. Assemblies are joined at the vehicle assembly plant or by a supplier. A double-D connection can be symmetrical or non-symmetrical and typically includes bolting the components together.

To complete assembly of an intermediate shaft, for example, the inner double-D shaft is slipped into the outer tubular double-D component and secured with a pinch bolt. During tightening of the pinch bolt, the inner double-D shaft chucks inside the outer tube which causes rotational runout. Surface protective coatings may be required which reduces the coefficient of friction, thereby causing the connection to chuck or rotate—or both—and become loose during operation. Depending on the pinch bolt torque requirement, the connection may not be robust and cause low torsional stiffness. A high clamp force is required for enough friction to provide a tight connection, and even the high clamp force may not result in satisfactory robustness if the double-D is small and/or the connection surface requires a protective coating that has a low coefficient of friction. All torque is carried along the two-line edges on the inside double-D in each direction (diagonal to one another) with the outer tube reacting that torque. For the aforementioned reasons, there is a need to improve the robustness of this connection.

SUMMARY

According to one aspect of the disclosure, a connection assembly includes a male component having a male connection end portion. The connection assembly also includes a female component having a female connection end portion for receiving the male connection end within a bore defined therein, wherein the male component and the female component each have a non-circular cross-section within a connection assembly thereof. The connection assembly further includes a first plurality of teeth formed on an outer surface of the male component. The connection assembly yet further includes a second plurality of teeth formed on an inner surface of the female component.

According to another aspect of the disclosure, a vehicle steering system includes a steering input shaft. The vehicle steering system also includes an output gear translatable to adjust the position of road wheels of a vehicle. The vehicle steering system further includes an intermediate shaft assembly operatively coupled to the steering input shaft and the output gear. The intermediate shaft includes a male component having a male connection end portion, a first flat surface and a second flat surface, the first flat surface and the second flat surface on opposing sides of the male component at the male connection end portion. The intermediate shaft also includes a female component having a female connection end portion for receiving the male connection end within a bore defined therein, the female component further comprising a first flat surface and a second flat surface on opposing sides of the bore to partially define the bore of the female component. The intermediate shaft further includes a first plurality of teeth formed on the first flat surface of the male component. The intermediate shaft yet further a second plurality of teeth formed on the first flat surface of the female component. The intermediate shaft also includes a third plurality of teeth formed on the second flat surface of the male component. The intermediate shaft further includes a fourth plurality of teeth formed on the second flat surface of the female component, wherein the first plurality of teeth and the second plurality of teeth are in contact with each other, wherein the third plurality of teeth and the fourth plurality of teeth are in contact with each other.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

The following discussion is directed to various embodiments of the disclosure. The embodiments disclosed herein should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

The present invention described herein may be incorporated into any suitable vehicle, such as a car, a truck, a sport utility vehicle, a mini-van, a crossover, any other passenger vehicle, any suitable commercial vehicle, or any other suitable vehicle. Moreover, principles of the present disclosure may apply to other vehicles, such as planes, boats, trains, drones, or other suitable vehicles. Moreover, the present invention may be incorporated into various steering system schemes and electric power steering (EPS) systems, including steer-by-wire systems.

Figure 1:
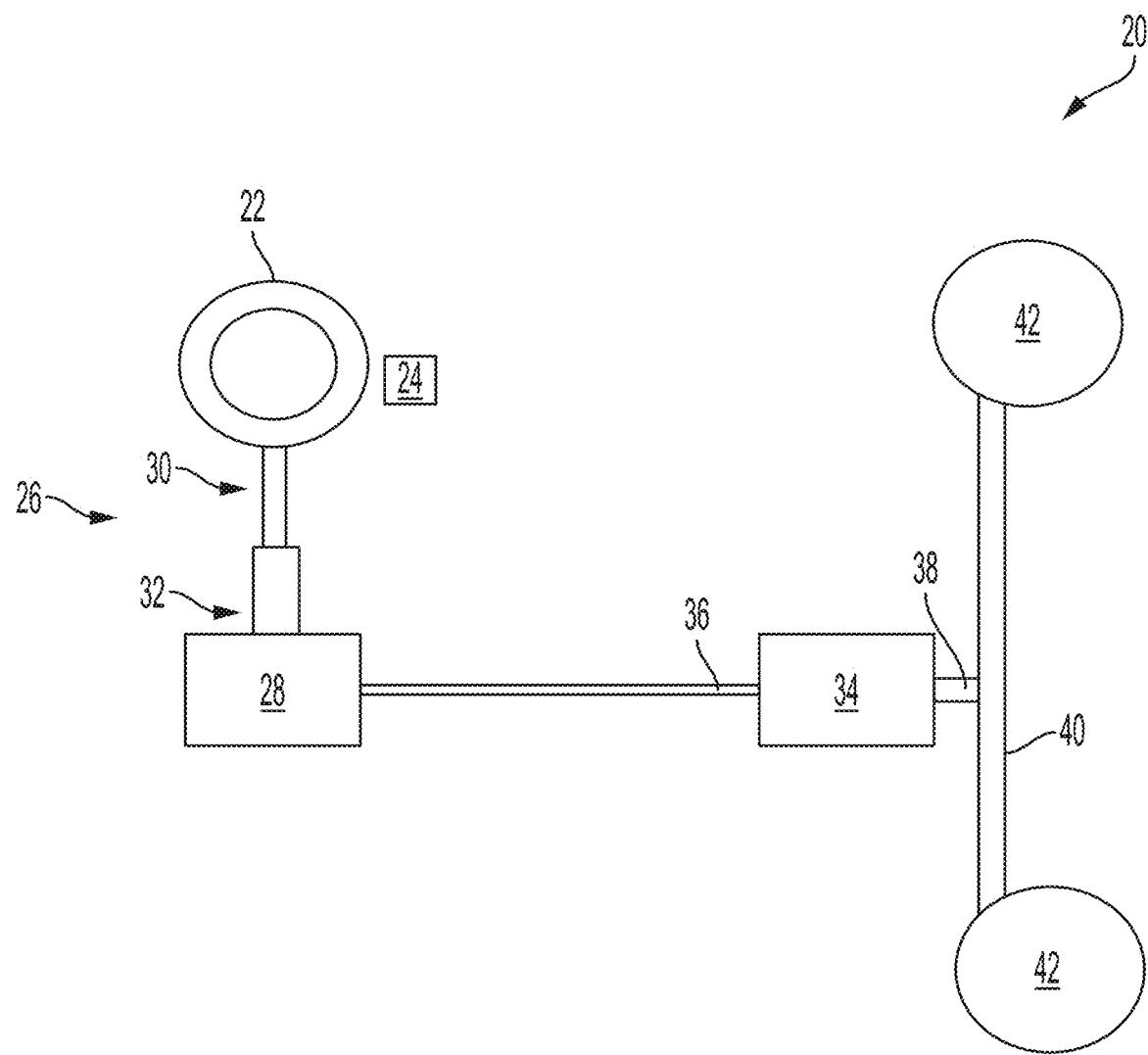
FIG. 1 schematically illustrates a steering system.

Referring initially to FIG. 1, a power steering system 20 is generally illustrated. The power steering system 20 may be configured as a driver interface steering system, an autonomous driving system, or a system that allows for both driver interface and autonomous or semi-autonomous steering. The steering system may include an input device 22, such as a steering wheel, wherein a driver may mechanically provide a steering input by turning the steering wheel. An airbag device 24 may be located on or near the input device 22. A steering column 26 extends along an axis from the input device 22 to an output assembly 28. The steering column 26 may include at least two axially adjustable parts, for example, a first portion 30 and a second portion 32 that are axially adjustable with respect to one another and which may house a steering shaft connected to the input device 22. The output assembly 28 may include a pinion shaft assembly 38, an intermediate shaft, a cardan joint, steer-by-wire components and/or any other features conventionally located opposite the input device 22. In other words, the steering column 26 may include a mechanical connection to a steering linkage 40 (also referred to as a rack) or may be a steer-by-wire system that does not require a continuous mechanical connection. The output assembly 28 may connect to a power-assist assembly 34 via a connection 36. The connection 36 may be one of a steering gear input shaft, a continuation of the pinion shaft assembly, or wired or wireless digital communication protocols.

The power-assist assembly 34 may operably connect to the steering linkage 40 via a steering gear assembly. In operation, actuation of the driver input 22 causes a responsive movement of the power-assist assembly 34 and causes the steering linkage 40 to steer an associated vehicle. The power-assist assembly 34 may be part of a single pinion electric assisted power steering (SPEPS) system, a dual pinion electric assisted power steering (DPEPS) system, a column electric power steering (CEPS) system, or a rack electric power steering (REPS) system.

Figure 2:
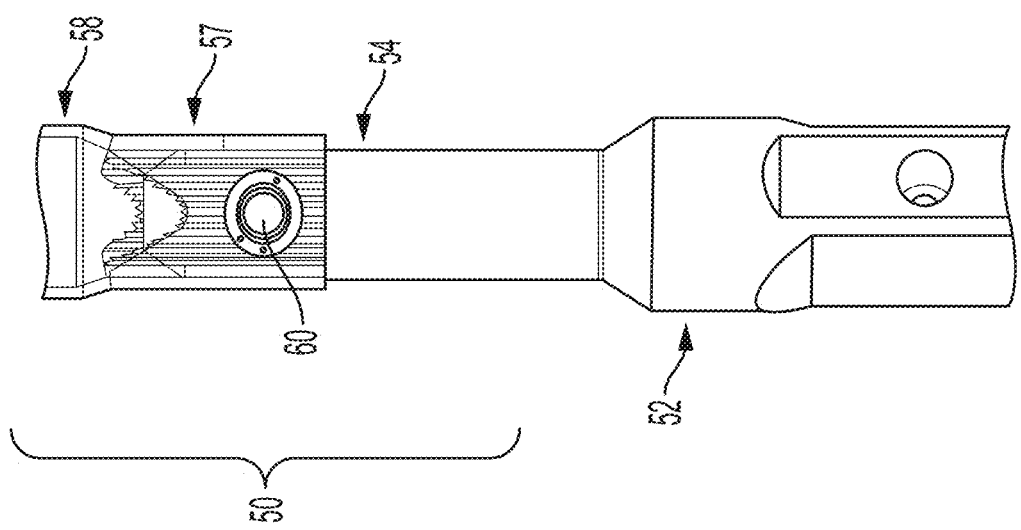
FIG. 2 is an elevation view of a connection assembly between two components of the steering system.

Referring now to FIG. 2, a connection assembly 50 of two vehicle components is illustrated. In particular, a male component, also referred to as a first component 52 herein, has an end portion 54 inserted within a bore 56 (FIG. 4) defined by an end portion 57 of a female component, also referred to as a second component 58 herein. The male component 52 may be a solid shaft or be tubular with at least a portion being hollow. The male component 52 and the female component 58 are mechanically secured to each other with a bolt 60, such as a pinch bolt, in the illustrated embodiments, but it is to be appreciated that the male component 52 and the female component 58 may be secured to each other in any suitable manner.

The embodiments of the components at the connection assembly 50 disclosed herein may be utilized with any components which are joined together. The embodiments particularly benefit connections where the joined components must withstand axial and torsional forces, relative to each other, during normal operating conditions of the components. The male component 52 and the female component 58 may be any components within the steering system 40 joined together in the manners discussed herein. In particular, the components may be part of a steering shaft, intermediate shaft, steering column, steering gear, or any other steering system component, assembly or sub-assembly. More broadly, the embodiments of the connection assembly 50 may be utilized in other vehicle regions outside of the steering system.

Figure 3:
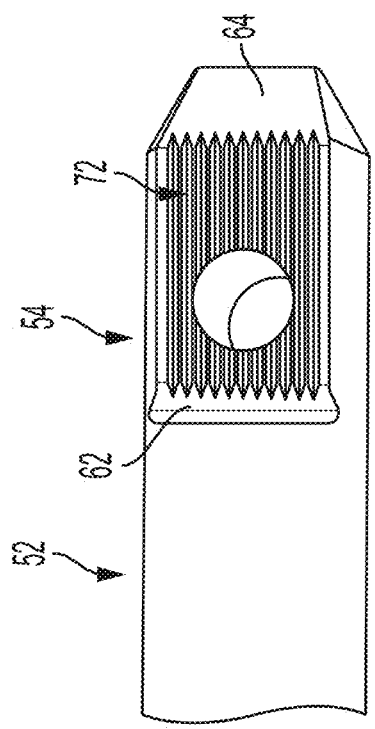
FIG. 3 is a perspective view of a portion of a first component of the two components.
Figure 4:
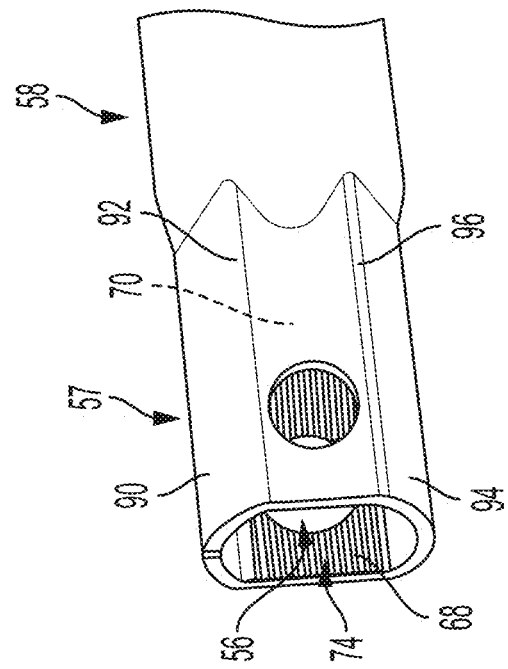
FIG. 4 is a perspective view of a portion of a second component of the two components.

Referring now to FIGS. 3 and 4, the respective end regions 54, 57 of the male component 52 (FIG. 3) and the female component 58 (FIG. 4) are illustrated in greater detail. The end regions 54, 57 are each non-circular in cross-section. The non-circular geometry may be referred to as multi-geometric shapes, such as a "double D" connection, as shown in the illustrated embodiments. Regardless of the specific geometry of the end regions 54, 57 of the male component 52 and the female component 57, it is to be appreciated that each of the end regions 54, 57 have at least one substantially flat surface. In particular, the male component 52 includes at least one flat surface 62 on an outer surface 64 thereof and the female component 58 includes at least one flat surface 68 on an inner surface 70 thereof. In some embodiments, the male component 52 includes flat surfaces 62 on opposing sides of the end portion 54. Similarly, in some embodiments, the female component 58 includes flat surfaces 68 on opposing inner sides of the end portion 57 to partially define the bore 56 of the female component 58.

The flat surface(s) 62 of the male component 52 and the flat surface(s) 68 of the female component 58 each include teeth formed thereon. In particular, the flat surface(s) 62 of the male component 52 includes a first plurality of teeth 72 and the flat surface(s) 68 of the female component 58 includes a second plurality of teeth 74. The first and second plurality of teeth 72, 74 are positioned on the flat surfaces 62, 68 to be mated with each other when the male component 52 is inserted into the bore 56 of the female component 58 in the assembled condition, as shown in FIG. 2 due to the transparency of the female component 58 in the drawing.

Referring to FIG. 4, in the illustrated embodiment of the female component 58, the non-circular cross-section of the female component 58 is illustrated in detail. In particular, the at least one flat surface 68 is shown with a first flat surface and a second flat surface on opposing sides of the bore 56 to partially define the bore 56. In such an embodiment, the first plurality of teeth 72 of a first flat surface 62 of the male component 52 are in contact with the second plurality of teeth 74 of the first flat surface 68 of the female component 58. Similarly, a third plurality of teeth 72 formed on the second flat surface 62 of the male component 52 are in contact with a fourth plurality of teeth 74 formed on the second flat surface 68 of the female component 58.

The female component also includes a first side 90 connecting and extending between first ends 92 of the first flat surface of the female component 58 and the second flat surface of the female component 58. A second side 94 of the female component connects and extending between second ends 96 of the first flat surface of the female component 58 and the second flat surface of the female component 58. In some embodiments, the first side 90 and the second side 94 of the female component 58 are each curved, but substantially flat geometries are contemplated.

Mating the male component 52 and the female component 58 with the plurality of teeth 72, 74 present does not impact assembly when compared to assemblies without such teeth, but eliminates the male component 52 from chucking inside the female component 58 when the pinch bolt 60 (FIGS. 2 and 5) is torqued during assembly. The mated teeth 72, 74 minimize rotating runout of the male component 52 within the female component 58 during connection with the bolt 60. The first and second plurality of teeth 72, 74 add surface area to the contact areas of the connection assembly 50 which increases axial stiffness, torsional stiffness and bending moment resistance. With greater teeth engagement, lower clamp force is required to accomplish a tight connection. The mated teeth 72, 74 carry torque along each side of every tooth depending on the direction of the applied torque, such that increasing the number of teeth interfacing with each other reduces the amount of reaction force per tooth, thereby increasing the torque carrying capability of the connection assembly 50 without allowing the male component 52 from rotating inside the female component 58 when the overall component assembly is torqued during normal operation. The mated teeth 72, 74 aid in small connections with low bolt torque requirements and benefit connections which require protective coatings on the connection surface since lower friction in such assemblies can decrease the stiffness of the joint.

Figure 8:
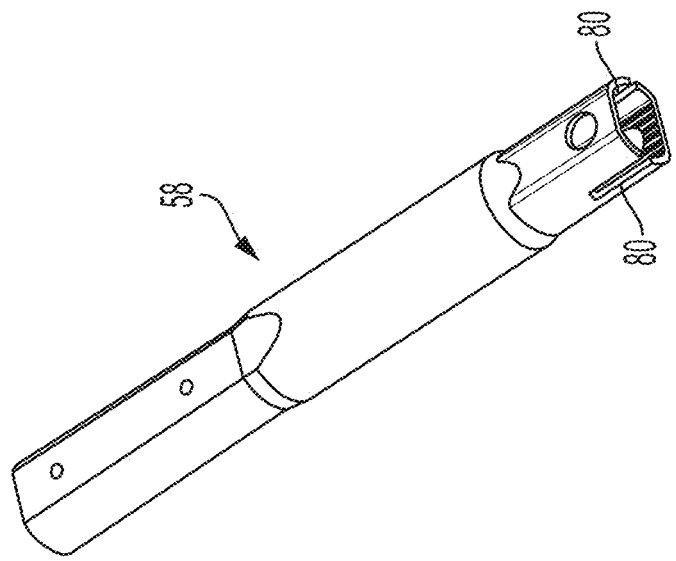
FIG. 8 is a perspective view of the second component according to an embodiment having two axially extending slots at the connection assembly.
Figure 7:
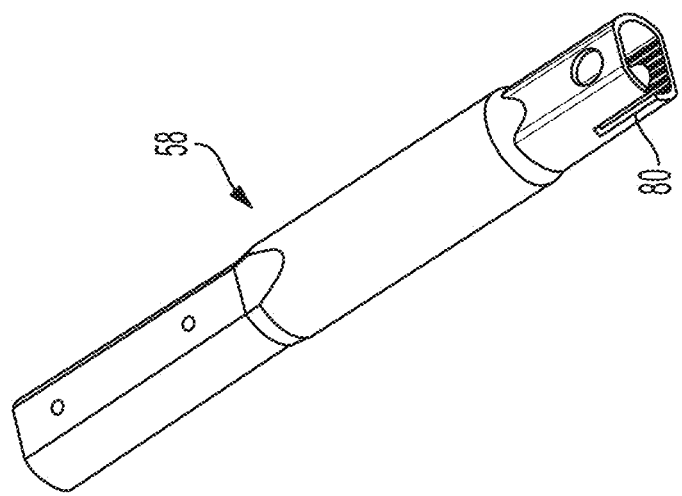
FIG. 7 is a perspective view of the second component according to an embodiment having one axially extending slot at the connection assembly.
Figure 6:
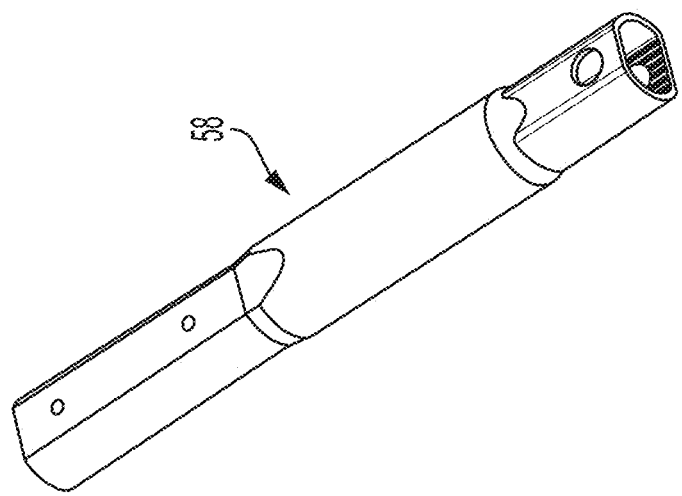
FIG. 6 is a perspective view of the second component according to an embodiment having no axially extending slots at the connection assembly.

Referring now to FIGS. 6-8, the female component 58 may include one or more slots 80. In embodiments with one or more slots 80, the slot(s) extend from the end 82 of the female component 58 in an axial, or longitudinal, direction of the female component 58 within the first side 90 and/or second side 94 of the end portion 57. For example a single slot (FIG. 7) may be present, two slots (FIG. 8) may be present or no slots may be present (FIG. 6). In a one-slot embodiment, the slot 80 may be present in either of the first side 90 or the second side 94 of the female component 58. In a two-slot embodiment, the slots 80 are located on opposing sides of the end region 57 of the female component 58 within both sides 90, 94. The slot(s) 80 provide customizability for different application requirements related to axial retention force and torque.

Figure 5:
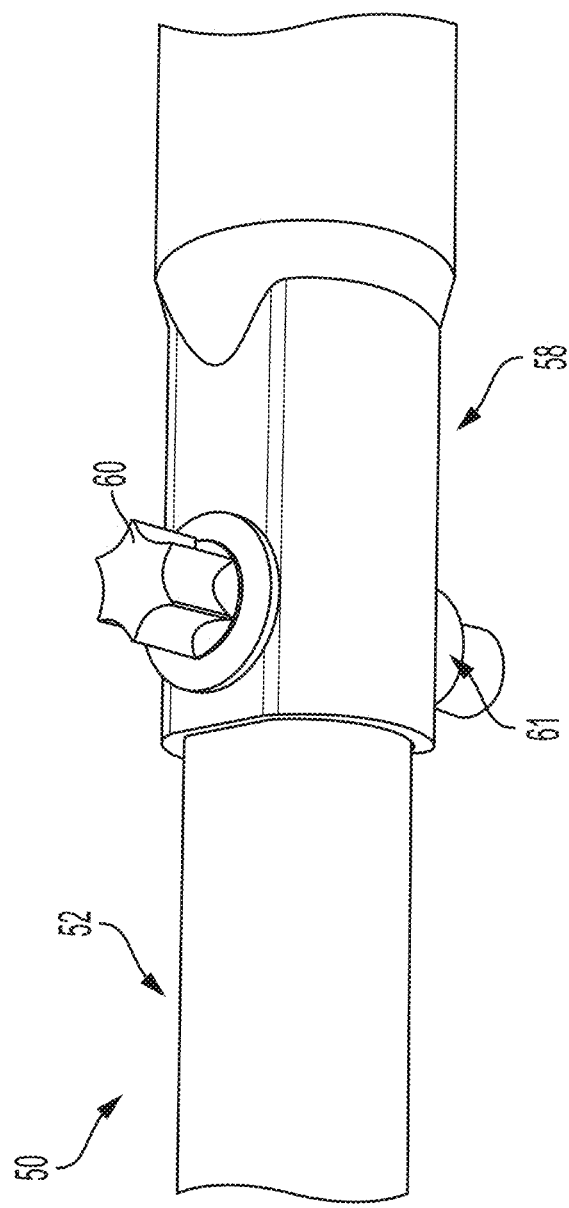
FIG. 5 is a perspective view of the connection assembly.

As shown in FIGS. 2 and 5, the bolt 60 may be used to connect the components 52, 58. In such an embodiment, the bolt 60 extends through the flat sides 68 of the female component and through the flat sides 62 of the male component 52. The bolt 60 is then secured with a nut 61.

In addition to bolting with the bolt 60, the components 52, 58 may be connected via plastic injection, staking, welding, riveting, interference fit or brazing. The use of the teeth 72, 74 on the substantially flat surfaces 62, 68 of the components 52, 58 provide many of the benefits discussed above in any of the connection examples noted above.

While the invention has been described in detail in connection with only a limited number of embodiments, it is to be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Moreover, any feature, element, component or advantage of any one embodiment can be used on any of the other embodiments. Accordingly, the invention is not to be seen as limited by the foregoing description.

What is claimed is:

1. A connection assembly comprising:
   a male component having a male connection end portion;
   a female component having a female connection end portion for receiving the male connection end within a bore defined therein, wherein the male component and the female component each have a non-circular cross-section within a connection assembly thereof and are secured to each other to prevent relative axial displacement between the male component and the female component;
   a first plurality of teeth formed on an outer surface of the male component; and
   a second plurality of teeth formed on an inner surface of the female component, wherein the non-circular cross-section of the male component comprises a flat surface on an outer surface thereof, wherein the non-circular cross-section of the female component comprises a flat surface on an inner surface thereof to partially define the bore of the female component, wherein the first plurality of teeth are formed on the flat surface of the male component and the second plurality of teeth are formed on the flat surface of the female component, wherein the first plurality of teeth and the second plurality of teeth are in contact with each other.

2. A connection assembly comprising:
   a male component having a male connection end portion;
   a female component having a female connection end portion for receiving the male connection end within a bore defined therein, wherein the male component and the female component each have a non-circular cross-section within a connection assembly thereof and are secured to each other to prevent relative axial displacement between the male component and the female component;
   a first plurality of teeth formed on an outer surface of the male component; and
   a second plurality of teeth formed on an inner surface of the female component, wherein the non-circular cross-section of the male component comprises a first flat surface and a second flat surface on opposing sides of the male component from each other, wherein the non-circular cross-section of the female component comprises a first flat surface and a second flat surface on opposing sides of the bore to partially define the bore of the female component, wherein the first plurality of teeth are formed on the first flat surface of the male component, the second plurality of teeth are formed on the first flat surface of the female component, further comprising a third plurality of teeth formed on the second flat surface of the male component and a fourth plurality of teeth formed on the second flat surface of the female component, wherein the first plurality of teeth and the second plurality of teeth are in contact with each other, wherein the third plurality of teeth and the fourth plurality of teeth are in contact with each other.

3. The connection assembly of claim 2, wherein the female component further comprises:
   a first side connecting and extending between first ends of the first flat surface of the female component and the second flat surface of the female component; and
   a second side connecting and extending between second ends of the first flat surface of the female component and the second flat surface of the female component.

4. The connection assembly of claim 3, wherein the first side of the female component and the second side of the female component are each curved.

5. The connection assembly of claim 3, wherein the first side of the female component defines an axially extending slot from an end of the female component in longitudinal direction of the female component.

6. The connection assembly of claim 3, wherein the second side of the female component defines an axially extending slot from an end of the female component in longitudinal direction of the female component.

7. The connection assembly of claim 3, wherein the first side of the female component and the second side of the female component each define a respective axially extending slot from an end of the female component in longitudinal direction of the female component.

8. The connection assembly of claim 2, wherein the male component and the female component are secured to each other with a bolt and a nut.

9. The connection assembly of claim 8, wherein the bolt extends through the first flat side of the female component, the first flat side of the male component, the second side of the male component, and the second flat side of the female component.

10. The connection assembly of claim 1, wherein the male component and the female component are secured to each other by at least one of plastic injection, staking, welding, riveting, interference fit and brazing.

11. The connection assembly of claim 1, wherein the male component and the female component are parts of a steering shaft assembly in a vehicle steering system.

12. The connection assembly of claim 11, wherein the male component and the female component are parts of an intermediate shaft assembly.

13. A vehicle steering system comprising:
a steering input shaft;
an output gear translatable to adjust the position of road wheels of a vehicle; and
an intermediate shaft assembly operatively coupled to the steering input shaft and the output gear, wherein the intermediate shaft comprises:
a male component having a male connection end portion, a first flat surface and a second flat surface, the first flat surface and the second flat surface on opposing sides of the male component at the male connection end portion;
a female component having a female connection end portion for receiving the male connection end within a bore defined therein, the female component further comprising a first flat surface and a second flat surface on opposing sides of the bore to partially define the bore of the female component, wherein the male component and the female component are secured to each other to prevent relative axial displacement between the male component and the female component;
a first plurality of teeth formed on the first flat surface of the male component;
a second plurality of teeth formed on the first flat surface of the female component;
a third plurality of teeth formed on the second flat surface of the male component; and
a fourth plurality of teeth formed on the second flat surface of the female component, wherein the first plurality of teeth and the second plurality of teeth are in contact with each other, wherein the third plurality of teeth and the fourth plurality of teeth are in contact with each other.

14. The vehicle steering system of claim 13, wherein the female component further comprises:
a first side connecting and extending between first ends of the first flat surface of the female component and the second flat surface of the female component; and
a second side connecting and extending between second ends of the first flat surface of the female component and the second flat surface of the female component.

15. The vehicle steering system of claim 14, wherein the first side of the female component and the second side of the female component are each curved.

16. The vehicle steering system of claim 14, wherein only one of the first side of the female component and the second side of the female component defines an axially extending slot from an end of the female component in longitudinal direction of the female component.

17. The vehicle steering system of claim 14, wherein the first side of the female component and the second side of the female component each define a respective axially extending slot from an end of the female component in longitudinal direction of the female component.

18. The vehicle steering system of claim 13, wherein the male component and the female component are secured to each other with a bolt and a nut.

19. The connection assembly of claim 2, wherein the male component and the female component are secured to each other by at least one of plastic injection, staking, welding, riveting, interference fit and brazing.

20. The connection assembly of claim 2, wherein the male component and the female component are parts of a steering shaft assembly in a vehicle steering system.

* * * * *